(12) United States Patent
Ichikawa et al.

(10) Patent No.: US 8,308,844 B2
(45) Date of Patent: Nov. 13, 2012

(54) METHOD OF REDUCTION TREATMENT OF METAL OXIDES OR STEELMAKING WASTE AND METHOD OF CONCENTRATING AND RECOVERING ZINC AND/OR LEAD

(75) Inventors: Hiroshi Ichikawa, Kitakyushu (JP); Tetsuharu Ibaraki, Kimitsu (JP); Shoji Imura, Kimitsu (JP); Hiroshi Oda, Kimitsu (JP); Yoichi Abe, Futtsu (JP); Shigeki Takahashi, Futtsu (JP); Nobuyuki Kanemori, Futtsu (JP); Satoshi Suzuki, Futtsu (JP)

(73) Assignee: Nippon Steel Corporation, Tokyo (JP)

( * ) Notice: Subject to any disclaimer, the term of this patent is extended or adjusted under 35 U.S.C. 154(b) by 0 days.

(21) Appl. No.: 12/930,952

(22) Filed: Jan. 19, 2011

(65) Prior Publication Data
US 2011/0113926 A1 May 19, 2011

Related U.S. Application Data

(63) Continuation of application No. 10/527,809, filed as application No. PCT/JP03/11654 on Sep. 11, 2003, now Pat. No. 7,879,132.

(30) Foreign Application Priority Data

Sep. 13, 2002 (JP) .................. 2002-268414
Jan. 23, 2003 (JP) .................. 2003-014268
Apr. 11, 2003 (JP) .................. 2003-107420

(51) Int. Cl.
*C22B 7/02* (2006.01)
*C22B 1/214* (2006.01)

(52) U.S. Cl. ................ 75/484; 75/658; 75/695; 75/763; 75/961

(58) Field of Classification Search .............. 75/484, 75/658, 695, 763, 961
See application file for complete search history.

(56) References Cited

U.S. PATENT DOCUMENTS

| | | | |
|---|---|---|---|
| 4,133,756 A | 1/1979 | Arai et al. | |
| 4,525,208 A | 6/1985 | Yasukawa et al. | |
| 5,851,490 A | 12/1998 | Myerson et al. | |
| 5,873,925 A | 2/1999 | Rinker et al. | |
| 5,942,198 A | 8/1999 | Myerson et al. | |
| 6,368,379 B1 | 4/2002 | Tateishi et al. | |
| 6,500,229 B1 | 12/2002 | Roux et al. | |
| 6,648,942 B2 | 11/2003 | Hoffman et al. | |
| 6,666,903 B1 | 12/2003 | Green | |

(Continued)

FOREIGN PATENT DOCUMENTS

CN 1345380 4/2002

(Continued)

OTHER PUBLICATIONS

European Search Report dated Aug. 10, 2009 issued in corresponding European Application No. 09 16 0043.

(Continued)

*Primary Examiner* — George Wszomierski
*Assistant Examiner* — Tima M McGuthry Banks
(74) *Attorney, Agent, or Firm* — Kenyon & Kenyon LLP

(57) ABSTRACT

A method of reduction treatment of metal oxides characterized by using as a material a powder containing metal oxides and containing alkali metals and halogen elements and further, in accordance with need, carbon, mixing the material with water to produce a slurry, then dehydrating this and charging the dehydrated material, mixed with another material in accordance with need, into a rotary hearth type reduction furnace for reduction.

10 Claims, 3 Drawing Sheets

U.S. PATENT DOCUMENTS 6,755,888 B2     6/2004    Ibaraki et al.

FOREIGN PATENT DOCUMENTS

| | | |
|---|---|---|
| EP | 0 834 583 | 4/1998 |
| EP | 1 170 384 | 1/2002 |
| EP | 1 439 236 | 7/2004 |
| JP | 50-101202 | 8/1975 |
| JP | 52-61108 | 5/1977 |
| JP | 53-29122 | 8/1978 |
| JP | 55-034685 | 3/1980 |
| JP | 55-104434 | 8/1980 |
| JP | 10-265861 | 10/1998 |
| JP | 2000-128530 | 5/2000 |
| JP | 2000-169906 | 6/2000 |
| JP | 2001-033173 | 2/2001 |
| JP | 2001-294942 | 10/2001 |
| JP | 2001-303115 | 10/2001 |
| JP | 2002-105518 | 4/2002 |
| JP | 2002-194452 | 7/2002 |
| JP | 2003-090686 | 3/2003 |
| WO | 93/19213 | 9/1993 |
| WO | 01/42516 | 6/2001 |
| WO | 03/031659 | 4/2003 |

OTHER PUBLICATIONS

Machine translation of JP 2002-194452, translation date Aug. 30, 2007.

Pickles, Chris, "Recent Research in EAF Dust Processing," Steel Mill Wastes and By-Products, Jun. 2-4, 1997, pp. 1-12.

Dourdounis, et al. "High-alumina cement production from FeNI-ERF slag, limesone and diasporic bauxite," Cement and Concrete Research, 34 (2004) 941-947.

METHOD OF REDUCTION TREATMENT OF METAL OXIDES OR STEELMAKING WASTE AND METHOD OF CONCENTRATING AND RECOVERING ZINC AND/OR LEAD

This application is a continuation of U.S. Ser. No. 10/527,809, filed Nov. 9, 2005, now U.S. Pat. No. 7,879,132 B2, which is a national stage application of International Application No. PCT/JP03/11654, filed Sep. 11, 2003, which claims priority to Japanese Application Nos. 2002-268414, filed Sep. 13, 2002, and 2003-014268, filed Jan. 23, 2003, each of which is incorporated by reference in its entirety.

TECHNICAL FIELD

The present invention relates to technology for reducing metal oxides in a rotary hearth type reduction furnace using a powder including powder metal oxides as a feed material and for removing alkali metals, halogen elements, and other impurities.

Further, it relates to technology for separating and recovering zinc and lead from dust of a refining furnace by a rotary hearth type reduction furnace.

Further, the present invention relates to a method of treatment and system of treatment of steelmaking waste which reduce by heating dust, sludge, and other steelmaking waste containing iron oxide produced in the steel refining and processing processes so as to mainly recover zinc oxide (ZnO).

BACKGROUND ART

There are various reduction processes for producing reduced iron or alloy iron. Among these, there is the process using powder metal oxides as feed materials to produce pellets and reducing these pellets at a high temperature.

This type of process is performed using a reduction furnace. As examples of such a reduction furnace, there are a shaft type hydrogen gas reduction furnace, rotary kiln type reduction furnace, rotary hearth type reduction furnace, etc.

Among these, a shaft type hydrogen gas reduction furnace reduces pellets made from powder ore by hydrogen gas.

On the other hand, in a rotary kiln type reduction furnace and rotary hearth type reduction furnace, heat is supplied to the reduction furnace and a reduction reaction is caused by the carbon mixed into the pellets. That is, in a rotary kiln type reduction furnace and rotary hearth type reduction furnace, shaped articles (pellets) obtained by mixing and shaping coal, coke, or other carbon and powder metal oxides are reduced.

The method of producing reduced iron using a rotary kiln type reduction furnace or rotary hearth type reduction furnace can use inexpensive coal etc., so is drawing attention as an economical method of producing reduced iron.

A rotary hearth type reduction furnace is a furnace of a type where a disk-shaped refractory hearth with a center cut away is rotated on rails at a constant speed under a fixed refractory ceiling and side walls. The diameter of the rotating hearth is 10 to 15 meters, while the width of the hearth is 2 to 6 meters.

While the hearth is rotating, the feed material feeder, heat zone, reduction zone, and product ejector are successively moved. The shaped articles of the feed material are charged from the feed material feeder. After this, the shaped articles are heated in the heat zone to about 1200° C. or more, then the carbon and metal oxides react in the reduction zone whereby a metal is produced.

In a method of reduction using a rotary hearth, the heating is quickly performed by radiation, so the reduction reaction ends in 7 to 20 minutes. The reduced shaped articles are ejected from the furnace and cooled, then used as a feed material for an electric furnace or blast furnace.

In this way, in a rotary hearth type reduction furnace, powder mainly comprised of carbon and metal oxides is used as the shaped articles for reduction by heating. In general, powders of at least three types of feed materials are used. This is to adjust the ratio between the metal oxides and carbon and adjust the composition of the particles sizes when producing the shaped articles.

In operation, these feed materials are mixed to produce the shaped articles. At this time, the feed material powders are mixed in a predetermined ratio so as to ensure a suitable chemical composition and particle size composition. The result is shaped by a molding machine.

In the method of reduction using a rotary hearth type reduction furnace, ore is generally used as the powder containing the metal oxides, but sometimes the dust or sludge produced in the metal refining process or processing process is used.

In particular, the dust or sludge produced in the ferrous metal industry includes zinc, lead, and other impurities. These evaporate at a reduction temperature of 1200° C. or more. Therefore, a rotary hearth type reduction furnace is an effective means for removing impurities.

In this way, in a rotary hearth type reduction furnace, the zinc, lead, and other impurities mixed in the shaped articles (pellets) form dust components in the exhaust gas. When the concentration of zinc or lead in the dust is high, the dust is used as a zinc feed material or lead feed material in nonferrous metal refineries.

To enable stable operation of a rotary hearth type reduction furnace, it is important to suitably adjust the chemical composition of the shaped articles (pellets). In regard to the operation, at the time of reducing the most general iron oxide, the amounts of the iron oxide and carbon, mainly the ratio of the iron oxide and carbon, are important as ingredients to be adjusted.

When using a powder feed material including, in addition to zinc and lead, alkali metals and halogen elements mixed in, special consideration is required for volatile substances mixed into the iron oxide in addition to adjustment of the ratio of the iron oxide and carbon.

The inventors, as disclosed in Japanese Unexamined Patent Publication (Kokai) No. 2003-090686 (Japanese Patent Application No. 2001-279055 of the same inventors), found that if the exhaust gas of a rotary hearth type reduction furnace contains a large amount of sodium chloride, potassium chloride, or other alkali metal halides, due to the (i) problem that these substances deposit as dust inside the exhaust gas treatment system and become factors inhibiting operation and the (ii) problem that the concentration of zinc in the dust falls and the value as a zinc feed material falls, it is important to prepare the feed material under the following conditions.

That is, as disclosed in Japanese Unexamined Patent Publication (Kokai) No. 2003-090686, the total number of moles (A) of zinc and lead in the feed material, the total number of moles (B) of potassium and sodium, and the total number of moles (C) of chlorine and fluorine are made to satisfy the relationship of $(0.8C-0.7B)/A < 0.36$. By preparing the feed material to satisfy these conditions, the deposition of dust inside the exhaust gas treatment system can be suppressed and stable operation over a long period of time becomes possible.

Further, as shown in Japanese Unexamined Patent Publication (Kokai) No. 2000-169906, the inventors have proposed to improve the structure of the exhaust gas treatment system and control the exhaust gas temperature so as to suppress deposition of dust. By combining these measures against dust deposition and the restrictions in feed material ingredients in the invention described in Japanese Unexamined Patent Publication (Kokai) No. 2003-090686, it is possible to maintain a stable operating state of the exhaust gas treatment system.

Accordingly, in the prior art, the feed material for use in a rotary hearth type reduction furnace was analyzed for composition in advance and the conditions on the feed material such as the contents of zinc and lead and halogen elements and alkali metals were restricted and the exhaust gas treatment system modified so as to solve the above problems.

However, the method of ensuring stable operation while preventing dust deposition in an exhaust gas treatment system of a rotary hearth type reduction furnace by restricting the contents of the zinc and lead and the halogen elements and alkali metals in the feed material suffers from the problem that the feed material is restricted to feed material containing relatively little amounts of halogen atoms and alkali metals.

For example, when treating dust containing iron oxide or pickling sludge of steel products produced at steelmaking plants, the content of the potassium chloride or sodium chloride in these feed materials is high and application of the method described in Japanese Unexamined Patent Publication (Kokai) No. 2003-090686 is difficult.

For example, the dust contained in blast furnace gas often contains a total of 1 mass % of potassium chloride or sodium chloride. Further, the sludge produced by pickling of steel products often contains the hydrochloric acid or fluoric acid used at the time of pickling and residual matter. In both cases, there is the problem that the above feed material conditions cannot be satisfied.

As a result, when treating dust or sludge by a rotary hearth type reduction furnace, the problem has arisen of the dust depositing at the gas passages of the boiler or heat exchanger for reclaiming waste heat and other locations inside the waste gas treatment system. That is, the zinc oxide or lead oxide end up containing a certain percentage or more of alkali metals and halogen elements.

Some of the dust generated from a rotary hearth type reduction furnace (hereinafter referred to as "secondary dust") contains alkali metals and halogen elements in a high rate of 20 to 45 mass %. As a result of this high rate of content, an inorganic mixture containing zinc oxide, zinc chloride, sodium chloride, potassium chloride, etc. mixed together is formed. This substance has a low melting point of 600° C. or less.

The secondary dust containing alkali metals and halogen elements in high concentrations exhibits an extremely high deposition ability under conditions of 400 to 600° C. This deposits on the gas passages of the boiler or heat exchanger to clog the exhaust gas channels and obstruct operation of the rotary hearth type reduction furnace.

In this way, in the case of a feed material containing large amounts of alkali metals and halogen elements, with just the prior art, these elements had a detrimental effect and stable operation was not possible.

Note that this dust deposition ability becomes higher when the ratio of the sodium chloride, potassium chloride, etc. with respect to the zinc oxide (partially zinc chloride) is high. Further, it becomes higher when the ratio of the sodium chloride, potassium chloride, etc. themselves is high.

Further, in a rotary hearth type reduction furnace, when performing recycling treatment consisting of introducing a carbon-bearing material or other reductant to the dust, sludge, or other steelmaking waste comprised mostly of iron oxide, but also containing a large amount of zinc and heating the result to reduce, evaporate away, and reoxidize the zinc oxide (ZnO) contained in the steelmaking waste so as to thereby recover it at a dust collector as secondary dust, the secondary dust will contain zinc in a high concentration, so the secondary dust can be utilized as a zinc feed material.

If the concentration of zinc in the zinc-containing secondary dust (converted to metallic zinc, hereinafter referred to as T. Zn, the same for the concentration of lead, which is converted to metallic lead and referred to as T. Pb) is 50 to 55%, the quality becomes one able to be directly utilized for a zinc blast furnace. This secondary dust is valuable as a zinc feed material.

However, when using such a feed material containing large amounts of alkali metals and halogen elements, the sodium chloride, potassium chloride, etc. of the feed material migrate to the secondary dust and cause the problem of a drop in the zinc concentration of the secondary dust.

In some cases, the concentration of alkali metals and halogen elements becomes 30 mass % or more and the T. Zn becomes a low 30 to 40 mass %, whereupon the secondary dust can no longer be directly used in a zinc blast furnace.

In particular, halogen elements inhibit the reaction at the time of zinc refining, so restriction of their quantity is an important item in management in zinc refining.

That is, to recycle recovered secondary dust as a zinc feed material, it is necessary to remove harmful substances from the low zinc concentration, high halogen concentration secondary dust by pre-treatment to concentrate the zinc. Further, this pre-treatment requires massive costs, so the cut-cutting and energy-saving effects to be inherently enjoyed due to recovery of zinc oxide are reduced and, in the worst case, cancelled out entirely.

Therefore, conventionally, only steelmaking waste with little chlorine content is selected as a feed material. Steelmaking waste with a high chlorine content has been deemed to have no merits for treatment and therefore has not been used as a recycling material.

Further, substantially the same problems occurred as with zinc when recycling lead as well.

As technology for recovering zinc, lead, and other valuable metals from dust including iron oxide, for example, Japanese Examined Patent Publication (Kokoku) No. 53-29122 discloses technology comprised of a step of washing the dust etc. to remove the chlorine, sodium, and potassium, a step of adding coke to the washed dust obtained at this step and granulating and sintering the same to obtain sintered iron ore containing zinc and lead, and a step of washing the sintered dust obtained by removing the dust from the sintering gas from this step by alkali water to remove the fluorine to obtain nonferrous metal slag containing lead and cadmium.

However, this technology, as described in Japanese Examined Patent Publication (Kokoku) No. 53-29122 (see page 3, column 6), does not reduce or vaporize the zinc in the sintering step, but leaves it in the sintered ore, so it is necessary to separately prepare a standing type distillation furnace etc. to reduce, vaporize, and recover the zinc.

Further, in this technology, the dust washed by the water contains 30 to 40% moisture, so as described in this publication (see page 2, column 4), it is necessary to dry it in a rotary drier etc. before sintering.

PCT Publication Pamphlet WO 01/42516 A1 discloses mixing by agitation a powder containing metal oxides and carbon in a state containing at least 1.0 times the moisture with respect to the powder weight, dehydrating this by a dehydration system until a moisture content of 16 to 26 mass %, then shaping it by a compression molding machine to produce shaped articles of a powder filling rate of 0.43 to 0.58, charging the shaped articles into a rotary hearth type reduction furnace having an atmospheric temperature of 1170° C. or less, and reducing them by sintering at 1200° C. or more.

Further, Japanese Unexamined Patent Publication (Kokai) No. 2001-303115 discloses technology of dehydrating a slurry of a mixture of powder containing metal oxides and powder containing carbon by a double-roll press type dehydrator down to a moisture content of 16 to 27%, producing shaped articles by an extrusion molding machine, and reducing by sintering the articles by a rotary hearth type reduction furnace to obtain metal.

However, in this technology, the high moisture content powder is charged into the reduction furnace without any drying step, so removal of the sodium chloride, potassium chloride, and other volatile harmful substances is not considered.

In this way, when using a rotary hearth type reduction furnace to treat a feed material containing large amounts of alkali metals and halogen elements, the following problems occur. In particular, there were problems in stable operation of the rotary hearth type reduction furnace and the pre-treatment for converting the secondary dust to a good quality zinc feed material.

Therefore, new technology enabling stable operation and pre-treatment of secondary dust economically even when using a feed material containing large amounts of alkali metals and halogen elements has been sought.

SUMMARY OF THE INVENTION

The present invention solves the above problem points in the prior art by providing a reduction treatment method and reduction treatment system comprising reducing by heating a powder containing powder metal oxides or dust or sludge or other steelmaking waste containing iron oxide produced in the steel refining and processing processes by a rotary hearth type reduction furnace or a moving hearth type reduction furnace so as to reduce the metal oxides and separately recovering the volatile harmful substances (alkali metals, halogen elements, and other impurities) and zinc oxide (ZnO) and further a zinc and/or lead concentration and recovery method.

(A) The gist of the invention for reduction treatment of powder containing powder metal oxides is as follows:

(1) A method of reduction treatment of metal oxides characterized by using as a feed material a powder containing metal oxides and containing alkali metals and halogen elements, mixing said feed material with water to produce a slurry, then dehydrating this and charging the dehydrated material into a rotary hearth type reduction furnace for reduction.

(2) A method of reduction treatment of metal oxides characterized by using as a feed material a powder containing metal oxides and containing alkali metals and halogen elements, mixing said feed material with water to produce a slurry, then dehydrating this, mixing the dehydrated material with another feed material, and charging said mixture into a rotary hearth type reduction furnace for reduction.

(3) A method of reduction treatment of metal oxides characterized by using as a feed material a mixed powder of a powder containing metal oxides and containing alkali metals and halogen elements and a powder containing carbon, mixing said feed material with water to produce a slurry, then dehydrating this, and charging said dehydrated material into a rotary hearth type reduction furnace for reduction.

(4) A method of reduction treatment of metal oxides characterized by using as a feed material a mixed powder of a powder containing metal oxides and containing alkali metals and halogen elements and a powder containing carbon, mixing said feed material with water to produce a slurry, then dehydrating this, mixing the dehydrated material with another feed material, and charging said mixture into a rotary hearth type reduction furnace for reduction.

(5) A method of reduction treatment of metal oxides as set forth in any one of the above (1) to (4), characterized in that said powder contains a total of at least 0.1 mass % of alkali metals and halogen elements.

(6) A method of reduction treatment of metal oxides as set forth in any one of the above (1) to (5), characterized in that a mass ratio of powder and water in said slurry is at least 1:1.5 and a mass ratio of powder and water in said dehydrated material is not more than 1:0.4.

(7) A method of reduction treatment of metal oxides as set forth in any one of the above (1) to (6), characterized by heating and agitating the slurry at 80° C. or less in the production of said slurry.

(8) A method of reduction treatment of metal oxides as set forth in any one of the above (1), (2), and (5) to (7), characterized by using as said feed material a powder containing both iron oxide and zinc oxide and/or lead oxide and containing alkali metals and halogen elements in a ratio alkali/(zinc+lead) between a total of the number of moles of alkali salts and a total of the number of moles of lead of at least 0.1.

(9) A method of reduction treatment of metal oxides as set forth in any one of the above (3), (4), and (5) to (7) characterized by using as said feed material a powder comprised of a mixture of a powder containing both iron oxide and zinc oxide and/or lead oxide and a powder containing carbon and containing alkali metals and halogen elements in a ratio alkali/(zinc+lead) between a total of the number of moles of alkali salts and a total of the number of moles of lead of at least 0.1.

(10) A method of reduction treatment of metal oxides as set forth in the above (8), characterized in that a pH of a slurry produced by mixing said powder with water is 7 to 11.5.

(11) A method of reduction treatment of metal oxides as set forth in the above (9), characterized in that a pH of a slurry produced by mixing said mixed powder with water is 7 to 11.5.

(12) A method of reduction treatment of metal oxides as set forth in any one of the above (1) to (11), characterized by shaping said dehydrated material into moist shaped articles having a porosity of at least 35% and charging said shaped articles into a rotary hearth type reduction furnace for reduction without drying.

(13) A method of reduction treatment of metal oxides as set forth in the above (12), characterized by making a mass ratio of powder and water in said dehydrated material 1:0.2 to 1:0.4 and shaping said dehydrated material into moist shaped articles having an average Volume of not more than 10000 mm$^3$.

(14) A method of reduction treatment of metal oxides as set forth in the above (13), characterized by making a molar ratio of oxygen and carbon contained in said shaped articles 1:0.6 to 1:1.5, charging said shaped articles into a rotary hearth type reduction furnace, and reducing them by leaving them for at least 8 minutes at the part of the furnace having a gas temperature or 120-0° C. or more.

(15) A method of reduction treatment of metal oxides as set forth in any one of the above (1) to (14), characterized in that said rotary hearth type reduction furnace is provided with an exhaust gas treatment facility having at least one of a waste heat boiler and an air preheater.

(16) A method of reduction treatment of metal oxides as set forth in any one of the above (1) to (15), characterized in that said powder is steelmaking waste.

(B) The gist of the invention for concentrating and recovering zinc and/or lead is as follows:

(17) A method of concentrating and recovering zinc and/or lead characterized by recovering dust in exhaust gas produced in the method of reduction treatment of metal oxides described in any of the above (1) to (16) as feed material for zinc and/or lead.

(C) The gist of the invention for reduction treatment of dust, sludge, or other steelmaking waste including iron oxide is as follows:

(18) A method of reduction treatment of steelmaking waste characterized by:
mixing by agitation steelmaking waste, a pH adjuster, and a carbon-bearing material in water, then concentrating the mixture to produce a slurry,
pressing said slurry to dehydrate it,
extruding said dehydrated material to shape it into shaped articles,
charging said shaped articles into a moving hearth type reduction furnace for reduction and recovering the secondary dust containing zinc oxide produced.

(19) A method of reduction treatment of steelmaking waste characterized by:
stirring and mixing steelmaking waste and a pH adjuster in water, then concentrating the mixture to produce a slurry,
pressing said slurry to dehydrate it,
adding and kneading a carbon-bearing material into said dehydrated material,
extruding said dehydrated material to shape it into shaped articles,
charging said shaped articles into a moving hearth type reduction furnace for reduction and recovering the secondary dust containing zinc oxide produced.

(20) A method of reduction treatment of steelmaking waste as set forth in the above (18) or (19) characterized in that said pH adjuster is a substance containing OH— groups.

(21) A method of reduction treatment of steelmaking waste as set forth in any one of the above (18) to (20) characterized in that said pH adjuster is fly ash discharged from a refuse melting furnace or incinerator furnace.

(22) A method of reduction treatment of steelmaking waste as set forth in any one of the above (18) to (21) characterized in that a pH of the slurry adjusted in pH by said pH adjuster is at least 8.

(23) A method of reduction treatment of steelmaking waste as set forth in any one of the above (18) to (22) characterized in that said dehydrated material contains moisture in an amount of 16 to 27 mass % of said dehydrated material.

(24) A system for reduction treatment of steelmaking waste characterized by being provided with:
an agitation tank for mixing by agitation steelmaking waste, a pH adjuster, and a carbon-bearing material in water,
a concentration tank for concentrating the agitated mixture to produce a slurry,
a dehydrator for pressing the slurry poured on endlessly moving filter cloth by at least one pair of rolls arranged above and below the cloth so as to dehydrate it,
a molding machine for extruding said dehydrated material from a die to shape it,
a moving hearth type reduction furnace for reducing said shaped articles, and
a dust collector for recovering the secondary dust containing zinc oxide produced in said moving hearth type reduction furnace.

(25) A system for reduction treatment of steelmaking waste characterized by being provided with:
an agitation tank for mixing by agitation steelmaking waste and a pH adjuster in water,
a concentration tank for concentrating the agitated mixture to produce a slurry,
a dehydrator for pressing the slurry poured on endlessly moving filter cloth by at least one pair of rolls arranged above and below the cloth so as to dehydrate it,
a kneader for adding and kneading a carbon-bearing material to said dehydrated material,
a molding machine for extruding said dehydrated material from a dies to shape it,
a moving hearth type reduction furnace for reducing said shaped articles, and
a dust collector for recovering the secondary dust containing zinc oxide produced in said moving hearth type reduction furnace.

Figure 1:
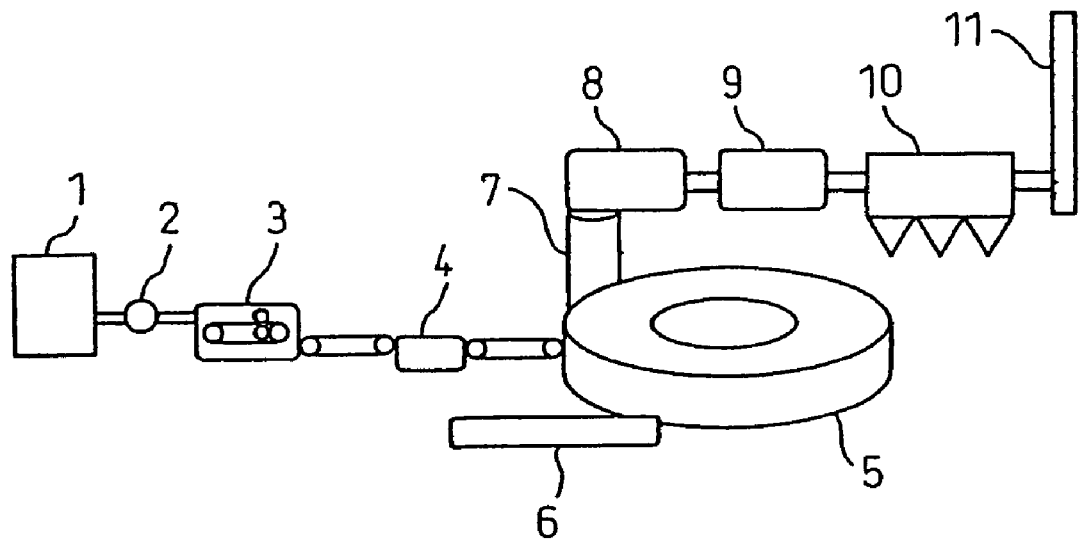
FIG. 1 is a view of an embodiment of the present invention for reduction treatment of steelmaking waste using a rotary hearth type reduction furnace.

THE MOST PREFERRED EMBODIMENT (I) Regarding Invention for Reduction Treatment of Powder Containing Powder Metal Oxides and Invention for Concentrating and Recovering Zinc and/or Lead An example of a facility for working the present invention is shown in FIG. 1. The facility of FIG. 1 is comprised of an agitation tank 1, a slurry pump 2, a dehydrator 3, a molding machine 4, a rotary hearth type reduction furnace 5, a reduced shaped article cooling device 6, an exhaust gas discharge duct 7, a waste heat boiler 8, a heat exchanger 9, a dust collector 10, and a flue 11.

The present invention dissolves all alkali metal halides (hereinafter referred to as "alkali salts") in water to remove them from the feed material powder and reduces the feed material powder in the rotary hearth type reduction furnace 5.

Note that here the example is taken of a feed material comprised of a mixture of mainly alkali salts so as to explain the method of the present invention, but the present invention is a method effective also for the reduction treatment of feed materials containing water-soluble compounds of alkali metals and halogen elements.

Such water-soluble compounds of alkali metals and halogen elements include sodium carbonate, potassium nitrate, sodium sulfate, ammonium chloride, etc.

At least two types of the feed material powder, if possible three types to six types, are prepared. Ones containing large amounts of metal oxides and ones containing carbon are prepared.

In general, fine powder ore, iron sand, fine powder coke, powder charcoal, dust produced from steelmaking blast furnaces, dust produced from steelmaking converters, dust produced from steelmaking electric furnaces, sludge produced in the process of pickling ferrous metal products or stainless steel products, etc. are used. It is also possible to use the dust including iron oxide and zinc produced when treating steelmaking dust by a rotary kiln etc.

Further, according to the present invention, it is possible to treat by a rotary hearth type reduction furnace even the fly, ash containing large amounts of sodium chloride and zinc and lead produced in melting type refuse incinerator furnaces—which could not be treated by a rotary hearth type reduction furnace in the prior art.

First, the chemical compositions of these feed material powders are analyzed. It is preferable to determine the ratios of blending of the different feed material powders based on the results of analysis. The matter of the greatest priority when adjusting the composition is to enable sufficient reduction of the oxides of the main target metal, so first the ratio of the reducible metal oxides and carbon is determined.

Here, the "reducible metal oxides" indicate oxides reduced by carbon monoxide at about 1300° C. and include iron oxide, manganese oxide, nickel oxide, zinc oxide, lead oxide, etc.

The molar ratio of the oxygen (active oxygen) and carbon bonded with these reducible metal oxides is adjusted to a suitable value. The molar ratio of the active oxygen and carbon is made 1:0.6 to 1:1.5.

Note that this molar ratio is the ratio between the value obtained by dividing the mass ratio of the content of the carbon by the atomic weight [12] of carbon and the value obtained by dividing the mass ratio of the content of the active carbon by the atomic weight [16] of oxygen.

At the time of the analysis of composition, it is preferable to obtain the elemental analysis values of the sodium, potassium, chlorine, fluorine, zinc, and lead in the feed material powder. Further, if necessary, it is also possible to obtain the analysis values for bromine, lithium, etc. Further, it is preferable to find the contents of the alkali salts by analysis.

However, quantitative analysis of alkali salts takes time, so it is also possible to estimate the contents of the alkali salts based on the analysis values of the elements.

In general, the analysis values of the elemental mass ratios of sodium, potassium, chlorine, and fluorine are obtained and the contents calculated from the balance of the anions and cations.

When the ratio of the chlorine, fluorine, and cations is greater than the chemical equivalents of the alkali salts, part of the chlorine or fluorine forms iron chloride, calcium chloride, zinc chloride, etc., so the weight of the alkali salts calculated from the small amount of cations and the molecular weight of the alkali salts is made the estimated content.

In this case, the excess chlorine and fluorine bond with elements other than the alkali metals by ratios proportional to the mass ratios.

Further, when the elemental analysis shows that the number of cations of the sodium or potassium is high, the mass of the alkali salts calculated from cations and the molecular weights of the alkali salts is made the estimated content.

In this case, the excess sodium and potassium bond with elements other than the halogens by ratios proportional to the mass ratios.

Further, the contents of the zinc and lead are analyzed to find the ratio of the total number of moles of the alkali salts contained in the feed material and the total number of moles of zinc and lead. Note that hereinafter this value will be referred to as the "alkali salt/(zinc+lead) molar ratio".

The feed material powder is mixed with water to produce a slurry. In this case, sometimes the ratio of the powder and water is made substantially constant, but for more efficient treatment, it is also possible to find the ratio of mixture of the powder and water based on the mass ratio of the alkali salts and the alkali salt/(zinc+lead) molar ratio.

When the content of the alkali salts is high, it is sufficient to increase the ratio of water. Further, when the content of the alkali salts is low, it is desirable to produce the slurry by a relatively low ratio of water to an extent enabling the amount of reduction of the alkali salts required to be secured.

When not removing the alkali metals and halogen elements from the feed material powder, the ability of the secondary dust to deposit inside the exhaust gas system of the rotary hearth type reduction furnace 5 rises and the exhaust gas passages will sometimes be clogged.

This is because at a high temperature of 800° C. or more, zinc oxide (sometimes also containing lead) and alkali salts easily react to produce substances having low melting points and strong deposition abilities. These deposit on the waste heat boiler 8 or the heat exchanger 9 at around 500° C.

For example, when reducing iron oxide powder, with a rotary hearth type reduction furnace, compared with a rotary kiln or other process, there is less flying iron oxide powder, so the rate of concentration of the alkali salts in the secondary dust is high.

Results of operation for reducing iron oxide as compiled by the inventors show that in general the rate of concentration of alkali salts in the secondary dust becomes 10 to 200 fold. Therefore, if the ratio of alkali salts in the feed material powder becomes 0.1 mass %, depending on the feed material conditions and the operating conditions of the rotary hearth type reduction furnace, the content of alkali salts in the secondary dust will exceed 10 mass %. Further, if the ratio of alkali salts in the feed material powder becomes 0.2 mass %, the content of the alkali salts in the secondary dust will become 20 to 40 mass %. In both cases, they pose big problems.

In these cases, the problem of deposition of the secondary dust in the exhaust gas treatment system arises even if strictly limiting the conditions of the temperature or flow rate of the exhaust gas in the exhaust gas treatment facility.

Therefore, when the ratio of the alkali salts in the feed material powder is 0.1 mass % or more, in particular 0.2 mass % or more, the method of reducing the alkali salts of the secondary dust according to the present invention proves effective.

Further, it is also effective to work the present invention under feed material conditions of an alkali salt/(zinc+lead) molar ratio of 0.1 or more.

Alkali salts are substances with high deposition abilities around 500° C. even standing alone, but become substances with further higher deposition abilities when bonded with one or more of zinc oxide, zinc chloride, lead oxide, and lead chloride.

The inventors discovered that when mixing alkali salts into zinc and lead oxides up to 10 mol %, the deposition ability does not become that high, but if mixing alkali salts in amounts of 10 mol % or more, the deposition ability of the secondary dust at around 500° C. becomes remarkably high.

Therefore, if the alkali salt/(zinc+lead) molar ratio of the feed material powder is 0.1 or more, even if the mass of the alkali salts in the feed material powder is 0.1% or less, the problem of deposition of secondary dust will arise in some cases, so under such a condition, it is effective to work the method of the present invention.

In the present invention, first, the powder of the feed material is mixed with water inside the agitation tank 1 to form a slurry and make the water-soluble alkali salts dissolve in the water.

At this time, it is necessary to sufficiently mix the mixture by agitation. Any agitation method may be used, but agitation by impeller rotation, agitation by flow of water, and agitation by gas intake are effective.

The inventors researched the conditions for stirring a slurry and as a result discovered that if the ratio of mixture of the powder and water is suitable, sufficient agitation enables the alkali salts to be dissolved and a slurry containing powder uniformly dispersed to be produced.

In the case of a powder mainly comprised of iron oxide, manganese oxide, zinc oxide, etc. and also containing about 8 to 15 mass % of carbon powder with respect to the overall mass, making the mass ratio of the powder and water 1:1.5 or more is necessary for good mixture by agitation.

In the case of a mass ratio of water less than this, the dynamic characteristics of the slurry will become insufficient and dissolution of the alkali salts in water and uniform mixture of the slurry will become impossible. Further, preferably, the mass ratio of the powder and water should be made 1:1.8 or more. Under these conditions, the mixing of the slurry becomes further sufficient.

The powder-water mass ratio can also be changed by the mass ratio of the alkali salts contained in the feed material powder. When the mass ratio of the alkali salts is extremely high, for example, when the content of the alkali salts is 0.4 mass % or more with respect to the total mass of the powder or when the alkali salt/(zinc+lead) molar ratio is an extremely high 1:0.2 or more, the powder-water mass ratio is made higher.

In general, the powder-water mass ratio should be in the range of 1:1.8 to 1:5. The reason is that when the ratio is a high one over 1:5, the agitation and mixing states will not be improved any further, while the problem will arise of the load on the dehydrator becoming larger when dehydrating, this slurry in a later step.

However, for example, when an extremely large amount of the alkali salts is contained such as when the content of the alkali salts becomes 1 to 2 mass % or more, the powder-water mass ratio is made 1:5 to 1:15 or so.

It is effective to raise the water temperature for the purpose of raising the speed of dissolution of the alkali salts and shortening the agitation time. Experiments of the inventors have shown that, compared with a water temperature of 20° C., at 30° C., the speed of dissolution of the alkali salts becomes 1.2 times faster and at a water temperature of 40° C. greatly increases about 3-fold.

Further, under conditions of a water temperature of 80° C., the speed of dissolution of the alkali salts becomes about 5 times faster and the effect is further increased, but with a water temperature of more than 80° C., there is almost no further effect of increase of the speed of dissolution of the alkali salts, the amount of energy consumed in raising the water temperature increases, and there is the detrimental effect of the generation of vapor at the slurry agitation tank.

Therefore, the upper limit of the slurry heating temperature for promoting dissolution of the alkali salts is 80° C., preferably 40° C. to 80° C.

If in this temperature range, 15 to 30 minutes of slurry agitation enables over 95% of the alkali salts to be dissolved.

On the other hand, when the feed material powder contains relatively large amounts of zinc and lead, it is necessary to adjust the pH of the water of the slurry. Zinc and lead are amphoteric metals and dissolve in acidic solutions or high pH strongly alkali solutions.

As a result, they become causes of contamination of water. Further, there is resulting loss of the useful metals of zinc and lead. Therefore, the pH is adjusted so that the zinc and lead will not dissolve in the water.

Experiments by the inventors showed dissolution of zinc and lead under acidic conditions of a pH of 7 or less. In particular, under conditions of a pH of 5 or less, the zinc and lead dissolved at considerably fast speeds.

Experiments by the inventors showed that with a slurry of a powder-water mass ratio of 1:2, under conditions of a pH of 3.5 and a water temperature of 55° C., 35% of the zinc and 23% of the lead dissolved with 20 minutes of stirring. As a result, the concentration of heavy metals in the water rose and after-treatment of the water after dehydration became necessary.

When the pH of the water becomes 7 or more, the zinc and lead will no longer dissolve much at all. On the other hand, the zinc and lead will start to dissolve from the point where the pH exceeds 11. This is because the zinc and lead become zinc acid ions and lead acid ions and react with the alkali ions.

Experiments by the inventors showed that with a slurry of a powder-water mass ratio of 1:2, with 20 minutes of agitation at a water temperature of 55° C. and a pH in the range of 7 to 11.5, the rates of dissolution of zinc and lead were 5% or less.

On the other hand, when the pH exceeded 11.5, the rate of dissolution increased. At a pH of 12, the rate of dissolution became 8.8%.

Therefore, in the case of a feed material powder containing a certain extent or more of, in general 0.3 mass % or more of, zinc and lead, the pH of the water forming the slurry is preferably in the range of 7 to 11.5.

After the end of the agitation, the slurry pump 2 is used to send the slurry to the dehydrator 3. The dehydrator 3 separates the water from the powder of the slurry. The moisture content of the powder after dehydration is made not more than 1:0.4 in terms of powder-water mass ratio (by the general indication of moisture content, corresponding to 29 mass %).

The powder-water mass ratio is determined by the conditions enabling efficient reduction treatment of the rotary hearth type reduction furnace. The detailed reasons will be given later.

If the powder-water mass ratio can be made 1:0.4 or less, any type of dehydrator 3 can be used, but a high pressure press dehydrator, centrifugal dehydrator, double-roll press type dehydrator, etc. is preferable.

If high performance machines of these types, it is possible to make the powder-water mass ratio 1:0.4 or less even with powder comprised of particles of an average particle size of 3 to 60 μm. Note that hereinafter, powder containing water after dehydration will be referred to as "dehydrated cake".

Under the slurry agitation conditions of the present invention, 90 to 95% or more of the alkali salts dissolve in the slurry water, so the concentration of alkali salts in the dehydrated cake is substantially determined by the powder-water mass ratios of the slurry and the dehydrated cake, that is, the concentration of the alkali salts in the water and the ratio of water remaining in the powder.

For example, when the powder-water mass ratios of the slurry and dehydrated cake are 1:2 and 1:0.3 respectively, the content of alkali salts of the dehydrated cake becomes the about 15% of the feed material powder. That is, about 85% of the alkali salts is removed.

The dehydrated cake is reduced by sintering in the rotary hearth type reduction furnace 5. In general, dehydrated cake cannot be reduced in the rotary hearth type reduction furnace 5 as it is, so a molding machine 4 is used to shape it into masses of diameters or lengths of 25 mm or less (shaped articles). These shaped articles are reduced in the rotary hearth type reduction furnace 5.

As the types of the shaped articles, there are the spherical pellets produced by pan-type granulating machines, briquettes compression molded by placing the powder in recesses of rolls, cylindrical pellets shaped by extrusion from nozzles, etc.

When using a pan-type granulating machine as the molding machine 4, for granulation, a moisture content of the feed material powder of 9 to 13 mass % is suitable. This moisture content corresponds to a powder-water mass ratio of 1:0.09 to 0.15. In general, it is a value lower than the lower limit of moisture able to be reached by the dehydrator 3.

Therefore, in this case, it is necessary to dry the powder after dehydration. With a general drying method, the alkali salts will not evaporate, so the content of alkali salts will not change even after drying.

The moisture content of the dried powder is reduced to 8 to 13 mass %, then a pan-type granulating machine is used to produce average 10 to 20 mm spherical pellets. These spherical pellets have low porosities or 22 to 30%. Under high temperature conditions such as the atmospheric temperature of the rotary hearth type reduction furnace, explosions will occur along with the evaporation of the moisture.

For this reason, in general, a dedicated drier is used to dry the spherical pellets to a moisture content of 1 mass % or less, then the spherical pellets are fed to the rotary hearth type reduction furnace.

Therefore, when using a pan-type granulating machine to shape the powder, in addition the configuration of equipment shown in FIG. 1, a dehydrated cake drier and spherical pellet drier become necessary. These are placed between the dehydrator 3 and molding machine 4 and between the molding machine 4 and rotary hearth type reduction furnace 5 respectively.

Further, when using a compression molding machine as a molding machine to produce the briquettes, similarly a drier is used to reduce the moisture content to 2 to 15 mass %, then the feed material powder is shaped.

To raise the shaping strength, it is possible to use an organic binder (corn starch etc.) When using this method, it is possible to produce briquettes with relatively low moisture contents. In many cases, the briquette drying step becomes unnecessary.

In general, when the porosity of the briquettes is less than 35%, under the high temperature conditions such as the atmospheric temperature of the rotary hearth type reduction furnace 5, explosions will occur along with the evaporation of the moisture, so it is important that the porosity be made 35% or more.

In this case, even briquettes with a moisture content of 16 to 20 mass % will not explode in the furnace. In this way, when shaping briquettes using the briquette molding machine, in addition to the configuration of equipment of FIG. 1, a dehydrated cake drier becomes necessary. This is placed between the dehydrator 3 and the molding machine 4.

It is possible to produce the shaped articles using any of the above two types of molding machines, but using a nozzle extrusion type molding machine to produce cylindrical pellets is particularly effective and an important means of the present invention.

FIG. 1 shows the layout of a facility in the case of working this shaping method. Cylindrical pellets have high porosities, so the shaped articles will not explode even if the speed of evaporation of the moisture is high. Therefore, even if the powder-water mass ratio is 1:0.4 or so, the articles can be directly fed into the rotary hearth type reduction furnace.

In the case of a nozzle extrusion type molding machine, if the feed material moisture content is 16 mass % or less, extrusion of the powder into the nozzle will become difficult and smooth shaping will not be possible. Therefore, the range of the moisture content of the powder is importantly, in terms of the powder-water mass ratio, 1:0.2 to 1:0.4.

The shaped articles have a porosity, indicating the ratio of the spaces between the powder particles in the dry state, of 40 to 60% so are structured to enable water vapor to quickly pass through them.

Therefore, in the present invention, when using a nozzle extrusion type molding machine, it is possible to omit the drying step of the powder or shaped articles. Therefore, as shown in FIG. 1, preparing the feed material by the combustion of slurry agitation, dehydration, and nozzle extrusion of the feed material powder is extremely economical. According to this method, it is possible to reduce powder containing alkali salts by a simple configuration of equipment.

Further, the inventors discovered that even if producing shaped articles with high porosities by methods other than nozzle extrusion, it is possible to supply the shaped articles to the rotary hearth type reduction furnace without a drying step.

That is, they confirmed that it is possible to produce shaped articles having porosities of 40 to 60% in the same way as nozzle extrusion even by the method of hardening dehydrated cake by compression or another method and then dividing the result or by shaping using a roll type compactor having stripe patterns.

In particular, if using a high pressure press type dehydrator, it is possible to produce a plate-shaped dehydrated cake with a porosity of 40 to 60% and a thickness of 20 to 50 mm and possible to divide this dehydrated cake into suitable sizes to produce shaped articles.

When the powder-water mass ratio of the shaped articles is 1:0.2 or less, the binder effect caused by the moisture is not manifested and the articles easily crumble.

Further, when the powder-water mass ratio is 1:0.4 or more, the shaped articles become too soft and the problem of deformation or adhesion at the time of transport surfaces.

Therefore, even when producing the above shaped articles, the powder-water mass ratio should be 1:0.2 to 0.4. Note that hereinafter, in the present invention, the shaped articles of cylindrical pellets produced by the above method or nozzle extrusion will be referred to as "moist shaped articles".

The shaped articles produced by the above method (spherical pellets, briquettes, or moist shaped articles) are fed into the rotary hearth type reduction furnace 5. The rotary hearth type reduction furnace 5 has a heat zone with the function of heating the shaped articles to cause the water to evaporate and the function of raising the temperature of the shaped articles.

The shaped articles raised to a high temperature in this heat zone enter the further higher temperature reducing atmosphere reduction zone. In this reduction zone, the shaped articles are heated to 1100° C. or more to cause a reduction reaction. Inside the shaped articles, the reducible metal oxides and carbon react to produce metal.

The residence time of the shaped articles in the furnace is generally 10 to 20 minutes. At this time, carbon monoxide is produced from the shaped articles. Zinc, lead, and other metals with high vapor pressures vaporize at this time and are released into the furnace gas of the rotary hearth type reduction furnace 5 from the shaped articles along with the carbon monoxide.

At this time, since the temperature of the shaped articles is 1000° C. or more, the high vapor pressure alkali salts also evaporate from the shaped articles and are released into the furnace gas.

The size of the moist shaped articles should be a maximum of not more than 20 to 25 mm or so when shaped close to spheres. The reason is that if the shaped articles are large, the conduction of heat inside the shaped articles is slow, the time for the evaporation of moisture and reaction is prolonged, and as a result the problem arises that the amount of production of the rotary hearth type reduction furnace is reduced.

Further, in the case of reducing shaped articles of a size of the above size or more, the problem arises of a difference in reduction rates between the surface and insides.

The shaped articles are not necessarily spherical, so in general it is preferable to express their sizes by volume. In the present invention, if expressing the size of the moist shaped articles required for a uniform reduction reaction by volume, it should be not more than 10000 $mm^3$.

The reduced shaped articles containing the reduced metals (iron, nickel, manganese, etc.) is ejected by a screw ejector from the rotary hearth type reduction furnace 5 and cooled by the reduced shaped article cooling device 9 to obtained the finished product.

The reduced shaped articles are used as feed material for producing molten iron by a steelmaking blast furnace, electric furnace, cupola, or other furnace having a melting function. In particular, in the case of reduced shaped articles to be charged into a steelmaking blast furnace or cupola where zinc, lead, an alkali salts become causes obstructing operation, it is necessary to reduce the contents of these ingredients.

Therefore, a feed material powder with high contents of zinc, lead, and alkali salts is preferably treated using the method of the present invention in a rotary hearth type reduction furnace, then used in a furnace having a melting function.

On the other hand, the exhaust gas produced inside the rotary hearth type reduction furnace 5 and the zinc or alkali salts etc. are exhausted to the exhaust gas discharge duct 7. This exhaust gas has a high temperature of around 1000° C., so is cooled by the waste heat boiler 8 and heat exchanger 9.

The heat exchanger 9 produces heated air. This heated air is used for the combustion air to reduce the amount of fuel. FIG. 1 shows the configuration of a facility provided with a waste heat boiler and a heat exchanger, but sometimes just one of the two is provided. Further, depending on the plant, sometimes there is no such waste heat recovery facility and a sprinkler system is used to cool the exhaust gas by sprinkling it with water.

After the exhaust gas temperature falls to 200° C. or less, the dust collector 10 recovers the secondary dust. The secondary dust is comprised of fine particles, so the dust collector 10 may be a bag filter type or a wet type. The exhaust gas from which dust has finished being collected is released into the atmosphere from the flue 11.

The present invention provides technology for preventing alkali salts or inorganic compounds comprised of zinc, lead, alkali metals, oxygen, and/or halogens from depositing inside the exhaust gas treatment system of the rotary hearth type reduction furnace 5. It has no waste heat recovery system and is also effective when using a water sprinkling device to form a system to cool the exhaust gas by sprinkling water.

For example, when the content of the zinc or alkali salts in the feed material totals about 3 mass % or more, the problem of deposition of secondary dust frequently occurred even in an exhaust gas treatment system of such a simple configuration.

Further, in the case of an exhaust gas treatment system provided with at least one of the waste heat boiler 8 and heat exchanger 9, sometimes the exhaust gas passages inside these are only 20 to 50 mm in interval. The measure for prevention of deposition of secondary dust according to the present invention is particularly effective in this case.

When using dust produced from steelmaking processes or steelmaking dust treatment furnaces as materials, this secondary dust contains large amounts of zinc and lead.

In the rotary hearth type reduction furnace 5, the shaped articles are placed stationarily on the hearth, so compared with a rotary kiln or other process, there is little feed material powder flying off into the exhaust gas. For example, when reducing powder mainly comprised of iron oxide but including a large amount of zinc, there is little flying iron oxide powder.

In the experiments conducted by the inventors, the content of iron oxide in the secondary dust was extremely low and no more than several percent. That is, in the case of little intermixture of iron oxide in the secondary dust, the zinc concentration rate of the secondary dust is high.

Further, in the method of the present invention, feed material from which part of the alkali salts has been removed is used, so the entry of alkali salts to the secondary dust is suppressed and as a result, the rates of concentration of the zinc and lead become higher.

As a result, when treating the relatively high zinc content blast furnace dust, converter dust, electric furnace dust, etc., the T. Zn can become 50 mass % or higher and sometimes even reach 60% at the maximum. The zinc concentration secondary dust has a high value as a zinc refining material.

In this way, when recovering zinc or lead of a feed material powder on a priority basis, it is important to suitably adjust the reaction conditions of the shaped articles. When the temperature of the exhaust gas of the rotary hearth type reduction furnace 5 is 1000 to 1100° C. or so, the vapor pressure of the zinc and lead is low and even if reduced, the rate of separation by evaporation from the shaped articles is small.

Therefore, for the purpose of promoting the separation by evaporation of zinc or lead, the temperature of the gas in the reduction zone of the rotary hearth type reduction furnace is made relatively high. Results of analysis by the inventors revealed that with a temperature of 1200° C. or more, the speed of separation by evaporation of zinc or lead is high.

Further, when the temperature of 1200° C. or more continues for 8 minutes or more, it is learned that the dezincification ratio and/or deleadification ratio becomes 85% or more.

Further, if making the gas temperature 1280° C. or more, it is learned that the dezincification ratio and/or deleadification ratio becomes 95% or more.

As explained above, in the present invention, the powder containing the alkali metals and halogen elements is washed and then treated in the rotary hearth type reduction furnace, but the method of washing only the powder containing large amounts of alkali metals and halogen elements in the material powder in the feed material powder and then mixing the result with a feed material powder with low contents of alkali metals and/or halogen elements is also within the scope of the present invention.

That is, when mixing iron foundry dust and iron ore together for use as a material, if making the powder with high contents of alkali metals and halogen elements a slurry and removing the alkali salts, it is possible to substantially achieve the desired object even without washing the iron ore.

In this way, the using a feed material powder containing large amounts of zinc or lead, the effect of the present invention is large and operation without any problem in the treatment of exhaust gas becomes possible.

The dust produced from rotary kilns and other primary zinc concentrating plants, steelmaking electric furnaces, steelmaking converters, and blast furnaces, the sludge produced from the zinc plating process, and other material powder containing lots of zinc and lead are treated by a rotary hearth type reduction furnace to obtain secondary dust which is used as a high priced zinc feed material.

Further, the secondary dust obtained by a dust collector treating exhaust gas produced by operation by the method of the present invention is used as a feed material for producing metallic zinc, zinc oxide, and other zinc products in zinc refining plants.

When the zinc contains a relatively large amount of lead, it may be treated directly at the wet electric refining system or zinc refining melting furnace to recover the metal zinc without any pre-treatment.

Example 1

The facility shown in FIG. 1 was used to work the present invention. The results are shown as Example 1. In the facility of FIG. 1, the dehydrator 3 is a double-roll press type. Further, the molding machine 4 is a nozzle extrusion type. In all operations, the slurry agitation time at the agitation tank 1 was made 20 minutes.

In the rotary hearth type reduction furnace 5, the reaction temperature in the reduction zone was made about 1300° C. and the treatment was performed for 10 to 15 minutes. The waste heat boiler 8 and the heat exchanger 9 of the exhaust gas treatment system were provided with strikers and soot blowers as devices for removing deposits.

The temperature of the exhaust gas inside the waste heat boiler 8 was 850 to 950° C. at the inlet and 450 to 600° C. at the outlet. Further, the temperature of the exhaust gas at the inside of the heat exchanger 9 was 450 to 600° C. at the inlet and 200 to 300° C. at the outlet.

The treatment capacities of the dehydrator 3 and the molding machine 4 were both 25 tons/hour (wet amount converted to 25% moisture), while the capacity of the rotary hearth type reduction furnace 5 was 23 tons/hour (wet amount converted to 25% moisture).

Figure 2:
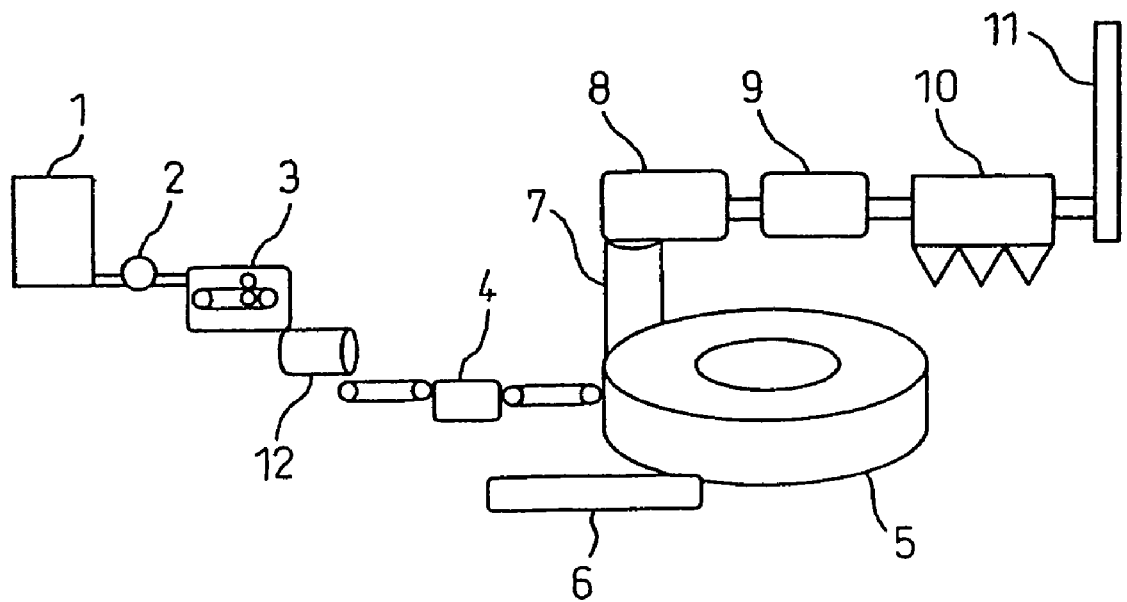
FIG. 2 is a view of another embodiment of the present invention for reduction treatment of steelmaking waste using a rotary hearth type reduction furnace.

Further, the facility shown in FIG. 2 is used for Example 1 and Comparative Examples 1 to 3. This also has a capacity of 23 tons/hour (wet amount converted to 25% moisture). This facility is provided with a briquette type molding machine 4 and a powder drier 12 between the dehydrator 3 and molding machine 4. The powder drier 12 dries the dehydrated cake, while the molding machine 4 shapes the dehydrated cake and sets the moisture content to a required value.

The waste heat boiler 8 and the heat exchanger 9 of the exhaust gas treatment system shown in FIG. 2 are also provided with strikers and soot blowers as devices for removing deposits. Note that the results of operation for the examples are shown in Table 1, while the results for the comparative examples are shown in Table 2.

Comparative Example 1 and Example 1 are examples of operation using a feed material mainly comprised of iron ore with relatively low contents of alkali salts, zinc, and lead. This feed material has a somewhat high ratios of alkali salts of 0.21 mass % and an alkali salt/(zinc+lead) molar ratio of a high 1.05.

An example of use of the facility shown in FIG. 2, but treating the shaped articles at 1280° C. for 15 minutes without working the present invention is shown in Comparative Example 1. With operation by this treatment, secondary dust of 8.3 kg/ton of shaped articles was produced and the concentration of dust in the exhaust gas was about 5 mg/Nm$^3$.

The total of the alkalis and halogens in this secondary dust was a high 12.7 mass %. Further, the ratio of the alkalis and halogens with respect to the zinc and lead was also high.

That is, this secondary dust was formed with complex inorganic compounds comprised of zinc, lead, alkalis, oxygen, and halogens. The inorganic compounds have melting points of about 420° C. and exhibited extremely high deposition ability at 400 to 600° C. As a result, in Comparative Example 1, deposition of secondary dust at the heat exchanger 9 could be recognized.

However, in Comparative Example 1, the concentration of dust in the exhaust gas was low, so after about 2 months, the effects of clogging of the heat exchanger 9 by deposition of secondary dust appeared.

Note that here, the reason why the alkalis and halogens in the secondary dust are not labeled as "alkali salts", but labeled as "alkalis" and "halogens" is that the alkalis and halogens in the secondary dust form composite inorganic compounds with zinc, lead, etc. and mostly are not in the form of simple alkali salts.

The exact same feed material was used for working the present invention in Example 1. Since the concentration of alkali salts in the feed material powder was low and almost all of the alkali salts was contained in the blast furnace dust, only the blast furnace dust was mixed with water.

Note that the mass ratio of the blast furnace dust was 25%. 95% of the total alkali salts was contained in the blast furnace dust.

By washing the blast furnace dust, the powder-water mass ratio in the agitation tank was lowered. Note that in the examples, the power-water mass ratio is shown as the "water/powder ratio" as so to facilitate entry into the tables.

In Example 1, the water/powder ratio was 1.56. Further, the water temperature was also set to a low 35° C. The water/powder ratio at the dehydrator 3 was 0.32. As a result, the content of alkali salts in the dehydrated cake fell and the content of alkali salts in the shaped articles dropped sharply to 0.05 mass %.

The pH of water is a slightly acidic 6.2, so a small amount of dissolution of zinc and lead was observed, but the amounts contained in the feed materials are originally small, so no actual problems arose.

This dehydrated cake was used as a feed material to make shaped articles which were then treated in a rotary hearth type reduction furnace 5 at a reduction zone gas temperature of 1280° C. for 15 minutes.

The volume of the shaped articles exceeded 10000 mm$^3$, so the metallization rate of iron and the dezincification rate were somewhat low, but the result was sufficient for use.

In Example 1, the rate of production of secondary dust fell to 6.2 kg/ton of shaped articles. Further, the ratio of alkali+halogen fell to 5.8 mass %.

The secondary dust had almost no deposition ability. No remarkable deposition of secondary dust to the heat exchanger 9 could be observed.

Example 2 is an example of operation treating feed material mainly comprised of converter dust and blast furnace dust. The feed material had a content of alkali salts of an intermediate 0.85 mass %, but a high alkali salt/(zinc+lead) molar ratio of 1.0.

The concentration of alkali salts in the feed material powder was an intermediate one, but the water/powder ratio of the agitation tank 1 was set to a somewhat low 1.9. The water temperature was made 48° C. to increase the speed of dissolution of the alkali salts. The water/powder ratio at the dehydrator 3 was 0.28.

As a result, the content of alkali salts of the dehydrated cake fell sharply to 0.14 mass %. The dehydated cake was shaped into shaped articles which were treated in the rotary hearth type reduction furnace 5, whereupon the rate of production of secondary dust became 15.7 kg/ton of shaped articles and the concentration of dust in the exhaust gas became about 11 mg/Nm$^3$. Further, the (alkali+halogen) ratio was 4.6 mass %.

The secondary dust had almost no deposition ability. No remarkable deposition of secondary dust to the heat exchanger 9 could be observed. The T. Zn of the secondary dust recovered by the dust collector 10 was a high 51. 5 mass %. Further, the T. Pb was also 10.8 mass %. The secondary dust could be used as a good feed material for a zinc refining melting furnace for the production of metallic zinc and metallic lead.

On the other hand, Comparative Example 2 is an example of operation reducing a feed material powder the same as Example 2 using the facility of FIG. 2, but not using the present invention.

The alkali salt content was 0.85 mass %, while the alkali salt/(zinc+lead) molar ratio was 1.0, so the amount of (alkalis+halogens) in the secondary dust became a high 13.6 mass %.

The melting point of this secondary dust was about 460° C. The deposition ability of secondary dust at 450 to 650° C. was extremely high.

The ratio of zinc and lead and the amount of production of secondary dust were greater than with Comparative Example 1. The concentration of dust in the exhaust gas was about 14 mg/Nm$^3$. As a result, after about two weeks, the effects of clogging of the heat exchanger 9 due to deposition of secondary dust appeared.

The content of the zinc and lead in the secondary dust was 42.7 mass % or lower compared with Example 2. The value as a feed material for zinc and lead was low.

As a result, when using the above secondary dust in a zinc refining melting furnace, pre-treatment becomes necessary for removing the alkalis and halogens before that and therefore the problem arises of an increase in the costs of zinc refining.

Example 3 is an example of operation for treating a feed material mainly comprised of electric furnace dust and fine particle scale of steel rolling. In this material, the content of the alkali salts was 0.7 mass %, while the alkali salt/(zinc+lead) molar ratio was 0.21.

The water/powder ratio of the agitation tank was set to 3.9, while the water temperature was set to 55° C. The water/powder ratio of the dehydrator 3 was 0.38.

As a result, the content of the alkali salts in the dehydrated cake fell greatly to 0.1 mass %. When shaping this dehydrated cake into shaped articles and treating them in the rotary hearth type reduction furnace 5, the rate of production of secondary dust was a relatively high 62.9 kg/ton of shaped articles and the (alkali+halogen) ratio was a low 2.2 mass %.

The above secondary dust had almost no deposition ability. No deposition of secondary dust at the heat exchanger 9 could be observed.

The secondary dust recovered by the dust collector 10 contained 55.1 mass % of T. Zn and 12.8 mass % of T. Pb. The above secondary dust was a good feed material for a zinc refining melting furnace. Metallic zinc and metallic lead could be produced from this secondary dust.

Example 4, Example 5, and Comparative Example 3 are examples of operation treating electric furnace dust and zinc concentration rotary kiln dust as main feed materials. These feed material powders are high in contents of zinc and lead and extremely high in alkali salt content, that is, 3.31 mass %.

Example 4 and Example 5 are examples of operations working the present invention. Further, Comparative Example 3 is an example of operation in the prior art.

Examples 1 to 3 show operations mainly aimed at the production of reduced iron. The main object of the above operation is the recovery of secondary dust concentrated in zinc and lead as a feed material for nonferrous metal refining.

Note that the feed material contained about 0.2% more chlorine than the mass ratio of the alkali metals and halogen elements for forming the alkali salts. According to analysis by X-ray diffraction, there was a small amount of zinc chloride present in the feed material, so it is believed that the above excess chlorine reacted with the zinc.

In Example 4, since the alkali salt content of the feed material powder was high, the water/powder ratio of the agitation tank 1 was set to 7.5 and the water temperature to 60° C. The water/powder ratio at the dehydrated cake fell greatly to 0.1 mass %.

This dehydrated cake was shaped into shaped articles which were treated at the rotary hearth type reduction furnace 5. The reaction condition was a gas temperature in the reduction zone of 1350° C. and a total residence time in the furnace of 12 minutes. Note that the residence time in the gas temperature part of 1200° C. or higher was 9 minutes.

As a result, the dezincification rate of the shaped articles was 95% or more, that is, almost all of the zinc could be recovered.

The secondary dust of Example 4 had a low (alkali+halogen) ratio of 1.7 mass %. As a result, there was almost no deposition ability of the secondary dust. The rate of production of the secondary dust was an extremely high 241.7 kg/ton of shaped articles, while the concentration of dust in the exhaust gas was a high one of about 180 mg/Nm$^3$.

Therefore, in the waste heat boiler 8 and the heat exchanger 9, the striker was frequently made use of. Due to this, no remarkable deposition of secondary dust could be observed.

The secondary dust recovered by the dust collector 10 contained 64.9 mass % of T. Zn and 9.4 mass % of T. Pb and further had small contents of alkalis and halogens, so was very good as a feed material for zinc and lead. This was used as a feed material for electric wet type zinc refining for production of metallic zinc.

Example 5 also uses the present invention, but the pH of the slurry water in the agitation tank was a too high 11.9, so parts of the zinc and lead dissolved in the water. As a result, the T. Zn of the shaped articles fell to 13.1 mass % and the T. Pb to 2.9 mass %.

The shaped articles were treated in the rotary hearth type reduction furnace 5. The reaction condition was a gas temperature in the reduction zone of 1320° C. and a total residence time in the furnace of 15 minutes. However, the residence time in the gas temperature part of 1200° C. or higher was 11 minutes. As a result, almost all zinc in the shaped articles could be recovered.

The rate of production of secondary dust in Example 5 was 216.7 kg/ton of shaped articles, while the (alkali+halogen) ratio was 1.86 mass %. As a result, despite the high concentration of dust in the exhaust gas, by taking measures similar to Example 4, there was almost no deposition of secondary dust.

The secondary dust recovered by the dust collector 10 contained 58.8 mass % of T. Zn and 8.7 mass % of T. Pb or somewhat lower compared with Example 4, but was also a very good feed material for zinc and lead. This was used as a feed material for wet type zinc refining for production of metal zinc by electric refining.

In Comparative Example 3, the feed material powder was treated in the rotary hearth type reduction furnace 5 without lowering the content of the alkali salts. The treatment conditions at the rotary hearth type reduction furnace 5 were substantially the same as in Examples 4 and 5. As a result, the total of the weights of the alkalis and halogens in the secondary dust become 18.6%.

The conditions of the high zinc content also overlap. This secondary dust was extremely high in deposition ability. Further, the concentration of dust in the exhaust gas was a large one of about 200 mg/Nm$^3$. Due in part to this, the heat exchanger 9 became clogged on day 4 after the start of treatment.

As a result, continuous operation of the rotary hearth type reduction furnace 5 was not possible and therefore economical operation was not possible.

Further, the secondary dust recovered by the duct collector 10 had high contents of T. Zn of 52.9 mass % and of T. Pb of 8.6 mass %, but also contained large amounts of alkali metals and halogen elements, so could not be directly used in a zinc refining process.

Due to these reasons, the above secondary dust had to be cleared of alkalis and halogens by pre-treatment, so the cost of refining zinc greatly rose. Note that to treat this feed material, the facility shown in FIG. 2 was also operated to bypass the waste heat boiler 8 and heat exchanger 9 and cool the exhaust gas by spraying water.

Due to these measures, there are no longer narrow width parts in the exhaust gas passage, so the period of continuous operation was extended to 10 days, but again continuous operation was not possible and therefore the costs rose. Further, the problem remained of the inability to recover the waste heat.

TABLE 1

| | Ex. 1 | Ex. 2 | Ex. 3 | Ex. 4 | Ex. 5 |
|---|---|---|---|---|---|
| Shaping method | Briquetting | Nozzle extrusion | Nozzle extrusion | Nozzle extrusion | Nozzle extrusion |
| Material conditions | | | | | |
| Type | Iron ore, blast furnace dust, powder anthracite | Converter dust, blast furnace dust, powder coke | Electric furnace dust, fine powder rolling scale, powder coke | Electric furnace dust, zinc concentration rotary kiln dust, powder coke | Electric furnace dust, zinc concentration rotary kiln dust, powder coke |
| Average particle size | 38 μm | 18 μm | 9 μm | 4 μm | 4 μm |
| T. Fe | 56% | 51% | 58% | 43% | 43% |
| Carbon/active oxygen molar ratio | 0.88 | 1.14 | 0.98 | 1.13 | 1.13 |
| NaCl ratio | 0.07% | 0.18% | 0.25% | 1.56% | 1.56% |
| KCl ratio | 0.11% | 0.33% | 0.12% | 0.45% | 0.45% |
| NaF ratio | 0.01% | 0.12% | 0.22% | 1.01% | 1.01% |
| KF ratio | 0.00% | 0.03% | 0.13% | 0.12% | 0.12% |
| Alkali salt mass ratio | 0.19% | 0.66% | 0.72% | 3.14% | 3.14% |
| Zinc ratio (T. Zn) | 0.19% | 0.88% | 3.67% | 16.6% | 16.6% |
| Lead ratio (T. Pb) | 0.02% | 0.11% | 1.11% | 3.3% | 3.3% |
| Alkali salt/(zinc + lead) molar ratio | 0.96 | 0.77 | 0.22 | 0.22 | 0.22 |
| Slurry in agitation tank 1 | | | | | |
| Water/powder ratio | 1.56 | 1.9 | 2.9 | 7.5 | 7.4 |
| Water temperature (° C.) | 35 | 48 | 55 | 60 | 62 |
| Water pH | 6.2 | 8.8 | 10.9 | 9.2 | 11.9 |
| Dehydrated cake water ratio | 0.32 | 0.28 | 0.38 | 0.24 | 0.26 |
| Shaped articles | | | | | |
| NaCl ratio | 0.017% | 0.028% | 0.036% | 0.053% | 0.060% |
| KCl ratio | 0.027% | 0.051% | 0.017% | 0.015% | 0.017% |
| NaF ratio | 0.002% | 0.019% | 0.030% | 0.032% | 0.037% |
| KF ratio | 0.000% | 0.005% | 0.019% | 0.005% | 0.006% |
| Alkali salt mass ratio | 0.05% | 0.10% | 0.10% | 0.11% | 0.12% |
| Zinc ratio | 0.18% | 0.88% | 3.60% | 16.1% | 13.1% |
| Lead ratio | 0.02% | 0.11% | 1.13% | 3.3% | 2.9% |
| Alkali salt/(zinc + lead) molar ratio | 0.25 | 0.12 | 0.03 | 0.01 | 0.01 |
| Average volume (mm$^3$) | 11,800 | 6,400 | 4,100 | 4,000 | 5,900 |
| Reduction conditions | | | | | |
| Reduction temperature (° C.) | 1280 | 1320 | 1260 | 1350 | 1320 |
| Reduction time (minutes) | 15 | 15 | 13 | 12 | 15 |

TABLE 1-continued

|  | Ex. 1 | Ex. 2 | Ex. 3 | Ex. 4 | Ex. 5 |
|---|---|---|---|---|---|
| Reduced product | | | | | |
| Total iron (T. Fe) | 79% | 73% | 75% | 66% | 64% |
| Iron oxide ratio | 64% | 84% | 81% | 88% | 83% |
| Zinc content | 0.04% | 0.07% | 0.17% | 0.83% | 0.75% |
| Secondary dust | | | | | |
| T. Zn | 22.4% | 51.5% | 55.1% | 64.9% | 58.8% |
| T. Pb | 2.9% | 10.8% | 12.8% | 9.4% | 8.7% |
| Na | 1.03% | 0.76% | 0.56% | 0.34% | 0.38% |
| K | 1.88% | 0.95% | 0.31% | 0.12% | 0.21% |
| Cl | 2.44% | 2.04% | 1.11% | 0.63% | 0.58% |
| F | 0.45% | 0.81% | 0.22% | 0.31% | 0.39% |
| Alkali + halogen | 5.80% | 4.55% | 2.20% | 1.40% | 1.56% |
| Generation rate (kg/ton) | 6.2 | 15.7 | 62.9 | 241.7 | 216.7 |
| Secondary dust deposition | None | None | None | None | None |

TABLE 2

|  | Comp. Ex. 1 | Comp. Ex. 2 | Comp. Ex. 3 |
|---|---|---|---|
| Shaping method | Briquetting | Briquetting | Nozzle extrusion |
| Material conditions | | | |
| Type | Iron ore, blast furnace dust, powder anthracite | Converter dust, blast furnace dust, powder coke | Electric furnace dust, zinc concentration rotary kiln dust, powder coke |
| Average particle size | 38 μm | 18 μm | 4 μm |
| T. Fe | 56% | 51% | 43% |
| Carbon/active oxygen molar ratio | 0.88 | 1.02 | 1.12 |
| NaCl ratio | 0.07% | 0.18% | 1.56% |
| KCl ratio | 0.11% | 0.33% | 0.45% |
| NaF ratio | 0.01% | 0.12% | 1.01% |
| KF ratio | 0.00% | 0.03% | 0.12% |
| Alkali salt mass ratio | 0.19% | 0.66% | 3.14% |
| Zinc ratio (T. Zn) | 0.19% | 0.88% | 16.6% |
| Lead ratio (T. Pb) | 0.02% | 0.11% | 3.3% |
| Alkali salt/(zinc + lead) molar ratio | 0.96 | 0.77 | 0.22 |
| Shaped articles | | | |
| NaCl ratio | 0.07% | 0.028% | 1.56% |
| KCl ratio | 0.11% | 0.11% | 0.45% |
| NaF ratio | 0.01% | 0.33% | 1.01% |
| KF ratio | 0.00% | 0.12% | 0.12% |
| Alkali salt mass ratio | 0.19% | 0.03% | 3.14% |
| Zinc ratio | 0.19% | 0.66% | 21.6% |
| Lead ratio | 0.02% | 0.11% | 4.3% |
| Alkali salt/(zinc + lead) molar ratio | 0.96 | 0.77 | 0.17 |
| Average volume (mm³) | 10,900 | 6,700 | 6,000 |
| Reduction conditions | | | |
| Reduction temperature (° C.) | 1280 | 1320 | 1320 |
| Reduction time (minutes) | 15 | 10 | 15 |
| Reduced product | | | |
| Total iron (T. Fe) | 79% | 73% | 62% |
| Iron oxide ratio | 69% | 80% | 80% |
| Zinc content | 0.04% | 0.08% | 0.66% |

TABLE 2-continued

|  | Comp. Ex. 1 | Comp. Ex. 2 | Comp. Ex. 3 |
|---|---|---|---|
| Secondary dust | | | |
| T. Zn | 19.4% | 42.7% | 52.9% |
| T. Pb | 1.9% | 8.2% | 8.6% |
| Na | 2.22% | 2.12% | 4.43% |
| K | 3.81% | 3.85% | 1.25% |
| Cl | 5.66% | 7.39% | 9.25% |
| F | 0.98% | 0.26% | 3.04% |
| Alkali + halogen | 12.7% | 13.6% | 18.0% |
| Generation rate (kg/ton) | 8.3 | 19.4 | 307.5 |
| Secondary dust deposition | None | None | None |

(II) Regarding Invention For Reducing Steelmaking Waste

Figure 3:
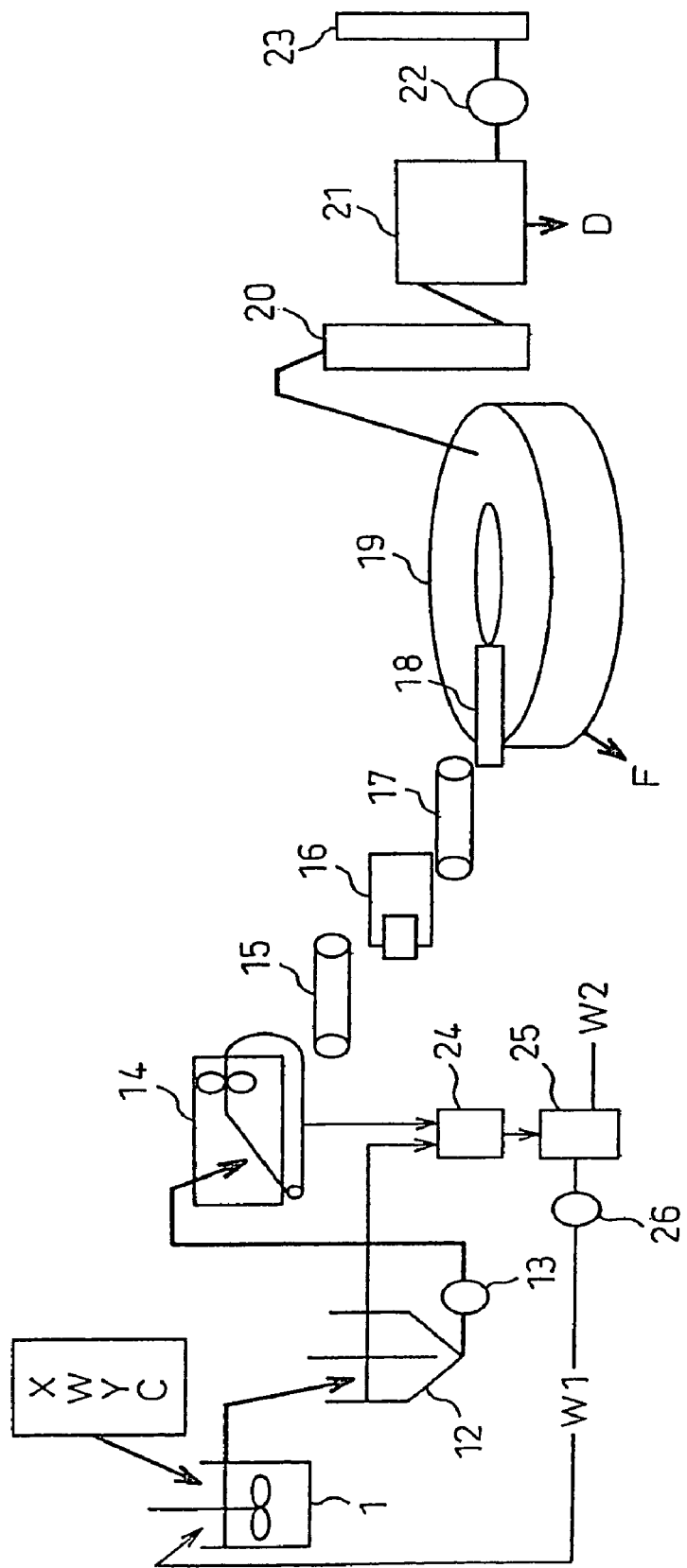
FIG. 3 is a view of an embodiment of the present invention for reduction treatment of steelmaking waste using a moving hearth type reduction furnace.

FIG. 3 is a view of an embodiment of the present invention for reducing steelmaking waste.

In FIG. 3, steelmaking waste X, water W, a pH adjuster Y, and a carbon-bearing material C are mixed by agitation in an agitation tank 1, the mixture is concentrated to a slurry in a concentration tank 12, then the slurry is sent by a slurry pump 13 to a double-roll press type dehydrator 14. In this dehydration step, the volatile organic substances in the waste (sodium chloride, potassium chloride, etc.) are removed.

The dehydrated cake dehydrated by the double-roll press type dehydrator 14 is sent by a dehydrated cake conveyor 15 to an extrusion type molding machine 16 where it is shaped into cylindrical shaped articles. These are conveyed by a shaped article conveyor 17 and supplied through a shaped article charging system 18 to a moving hearth furnace (for example, a rotary hearth furnace) 19.

The shaped articles reduced by heating in the moving hearth furnace 19 become reduced iron F. The gas produced at this time is cooled by a gas cooler 20, then the dust is recovered as high zinc secondary dust D containing zinc oxide (ZnO) by a dust collector 21. The exhaust gas is released through a blower 22 from the flue 23.

Further, the moisture discharged from the concentration tank 12 and double-roll press type dehydrator 14 is collected at a return water tank 24 and treated at a water treatment system 25. The water required for agitation of the material is then returned as return water W1 by a return water pump 26 to the agitation tank 1, while the remainder is discharged (W2 in the figure).

Figure 4:
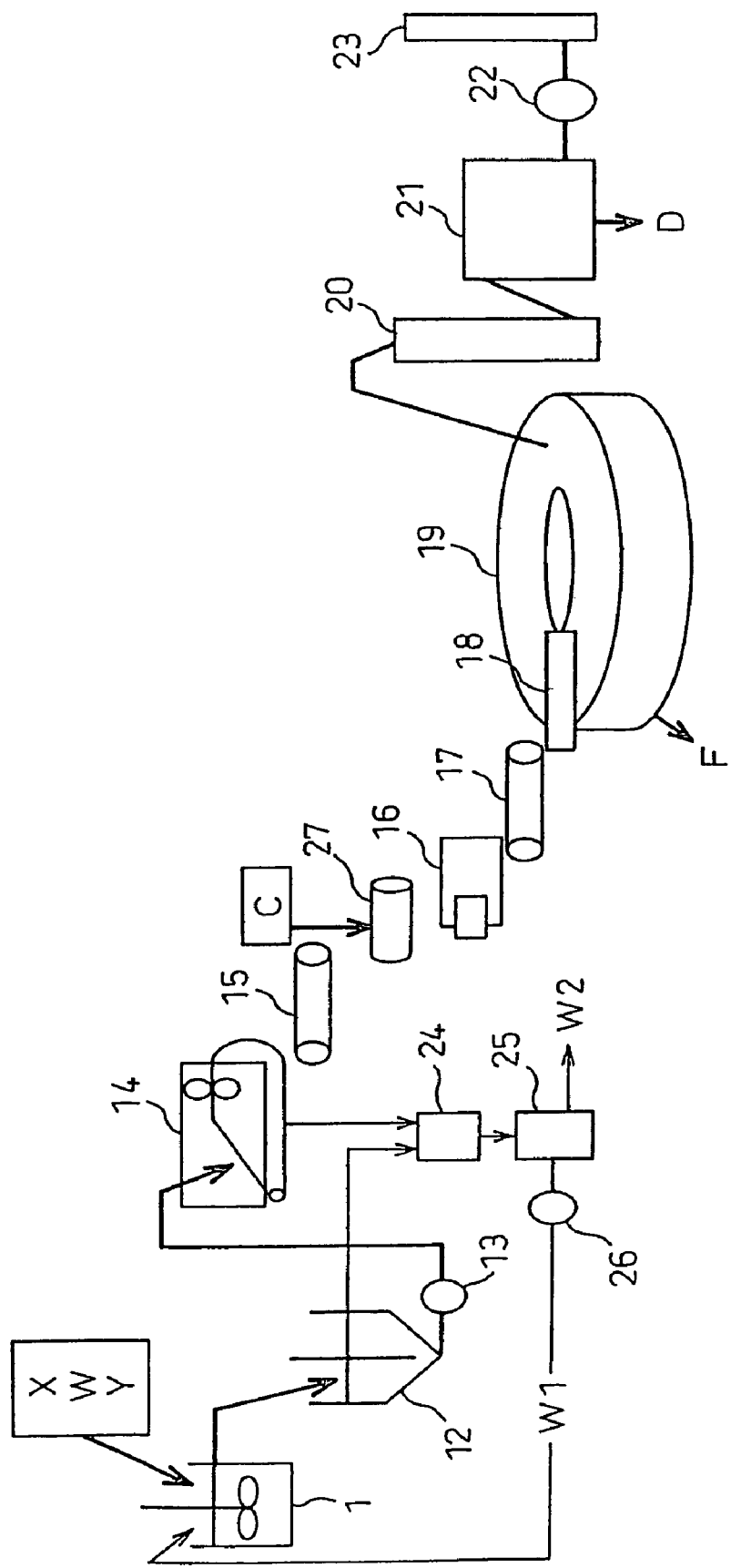
FIG. 4 is a view of another embodiment of the present invention for reduction treatment of steelmaking waste using a moving hearth type reduction furnace.

In the embodiment shown in FIG. 1, the carbon-bearing material C is mixed by agitation in the agitation tank 1, but as shown in FIG. 4, it is also possible to mix by agitation the steelmaking waste W and pH adjuster Y in water, then concentrate the mixture to obtain a dehydrated slurry, add the carbon-bearing material C to this, then knead the mixture using a kneader 27.

Further, if the molding machine 16 is one also provided with a kneading function, the kneader 27 may be omitted.

Example 2

The present invention was used to treat electric furnace dust (steelmaking waste). The results are shown below.

The present invention was used to wash the electric furnace dust and then analyze the ingredients. The results are shown in Table 3. Further, the rates of removal of the different ingredients are shown in Table 4.

The test conditions were made a washing solution temperature of 60° C., a washing water/dust ratio of 10, and an agitation time of 30 minutes.

TABLE 3

|  | NaOH added | pH | Zn | Pb | Na | K | Cl | TFe |
|---|---|---|---|---|---|---|---|---|
| No washing |  |  | 18.9% | 1.71% | 1.90% | 1.71% | 5.56% | 28.8% |
| After washing | 0.0% | 6.7 | 20.0% | 1.82% | 0.26% | 0.21% | 2.86% | 30.8% |
|  | 9.5% | 9.3 | 21.4% | 1.94% | 0.33% | 0.10% | 0.61% | 32.6% |
|  | 10.0% | 11.4 | 21.5% | 1.94% | 0.52% | 0.09% | 0.68% | 32.7% |
|  | 12.0% | 13.0 | 21.8% | 0.92% | 0.29% | 0.08% | 0.64% | 33.2% |

TABLE 4

|  | NaOH added | pH | Zn | Pb | Na | K | Cl |
|---|---|---|---|---|---|---|---|
| After washing | 0.0% | 6.7 | 1.141% | 0.56% | 87.2% | 88.5% | 51.9% |
|  | 9.5% | 9.3 | 0.002% | 0.14% | 84.8% | 94.9% | 90.4% |
|  | 10.0% | 11.4 | 0.004% | 0.09% | 75.7% | 95.4% | 89.3% |
|  | 12.0% | 13.0 | 0.464% | 53.41% | 86.7% | 95.8% | 90.1% |

As shown in Table 3 and Table 4, if washing the electric furnace dust without adjusting the pH, a weak acidity of pH 6.7 is exhibited and the Cl removal ratio at that time is only about 52%, but if adding NaOH and making the pH about 9 to 12, the Cl removal ratio rises to about 90% and the loss of Zn also becomes very small.

Note that even if the pH rose to about 13, the rise in the Cl removal ratio leveled off and the Zn loss increased.

The filtrate concentration (ppm) at this time is shown in Table 5.

TABLE 5

|  | NaOH added | pH | Zn | Pb | Na | K | Cl |
|---|---|---|---|---|---|---|---|
| After washing | 0.0% | 6.7 | 539 | 33.10 | 2,550 | 2,870 | 8,610 |
|  | 9.5% | 9.3 | 0.76 | 8.76 | 7,180 | 2,920 | 13,500 |
|  | 10.0% | 11.4 | 1.74 | 5.86 | 7,480 | 2,880 | 14,310 |
|  | 12.0% | 13.0 | 221 | 3,354 | 12,140 | 3,040 | 14,620 |

In each case, the general discharge standard in Japan, that is, Pb<0.1 ppm, is exceeded, so water treatment is required for discharge.

The water treatment, that is, the generally practiced addition of a pH adjuster $FeCl_3$ and polymer flocculating agent, resulted in Pb<0.1 ppm and enabled discharge.

Next, powder coke was added to the steelmaking waste which was then heated and reduced. The secondary dust was trapped and subjected to a reduction test. The results are shown in Table 6.

TABLE 6

(Unit: ppm)

|  | NaOH added | pH | Zn | Pb | Na | K | Cl |
|---|---|---|---|---|---|---|---|
| No washing |  |  | 55.0% | 5.0% | 4.2% | 4.5% | 16.4% |
| After washing | 0.0% | 6.7 | 65.7% | 6.0% | 0.7% | 0.6% | 9.5% |
|  | 9.5% | 9.3 | 70.4% | 6.4% | 0.8% | 0.3% | 2.0% |

The secondary dust when reducing unwashed dust contained about 16% Cl, about 9% (Na+K), and about 55% Zn, so was low in purity of Zn, while the secondary dust when reducing dust washed at a pH of about 9 contained about 2% Cl, about 1% (Na+K), and about 70% Zn (about 88% ZnO), so was greatly improved in Zn purity.

Further, the inventors conducted a test using refuse melting furnace fly ash instead of the above NaOH as the pH adjuster. The ingredients of the refuse melting furnace fly ash used for the test are shown in Table 7, the results of the test in Table 8, and the removal ratios of the different ingredients in Table 9.

The test conditions were a washing temperature of 60° C., a washing water/dust ratio of 10, and an agitation time of 30 minutes.

TABLE 7

| Zn | Pb | Na | K | Cl | TFe | Ca | Si | pH | CaO/$SiO_2$ |
|---|---|---|---|---|---|---|---|---|---|
| 6.12% | 1.15% | 5.15% | 4.27% | 19.4% | 0.7% | 19.4% | 4.23% | 11.0 | 3.0 |

TABLE 8

|  | Fly ash added | pH | Zn | Pb | Na | K | Cl | TFe | Ca | Si | CaO/SiO$_2$ |
|---|---|---|---|---|---|---|---|---|---|---|---|
| No washing | 0 |  | 18.9% | 1.71% | 1.90% | 1.71% | 5.56% | 28.8% | 1.71% | 1.87% | 0.60 |
| After washing | 10% | 9.9 | 19.7% | 1.84% | 0.37% | 0.11% | 0.73% | 29.2% | 3.32% | 2.32% | 0.94 |

TABLE 9

|  | Fly ash added | pH | Zn | Pb | Na | K | Cl |
|---|---|---|---|---|---|---|---|
| After cleaning | 10% | 10 | 0.01% | 0.1% | 84.9% | 95.0% | 90.4% |

As shown in Table 7, the refuse melting furnace fly ash had a pH of about 11 and a strong alkaline nature. This was because the calcium hydroxide (Ca(OH)$_2$) blown into the exhaust gas of the melting furnace in order to neutralize the HCl contained in the exhaust gas remains in the fly ash.

Therefore, the fly ash also had a high Ca content and a basicity (CaO/SiO$_2$) of about 3.

As shown in Table 8, if adding refuse melting furnace fly ash to the electric furnace dust at a mass ratio of 10% and making the pH about 10 at the time of washing, it is possible to raise the Cl removal ratio to about 90%. The loss of Zn also becomes extremely small.

Further, the basicity (CaO/SiO$_2$) also rose from the about 0.6 before addition of the refuse melting furnace fly ash to 0.9 or more.

Next, the inventors added powder coke to the electric furnace dust, reduced the dust, and trapped the secondary dust. The results are shown in Table 10.

TABLE 10

|  | Fly ash added | pH | Zn | Pb | Na | K | Cl |
|---|---|---|---|---|---|---|---|
| No washing | 0 |  | 55.0% | 5.0% | 4.2% | 4.5% | 16.4% |
| After cleaning | 10% | 9.9 | 69.1% | 6.4% | 1.3% | 0.4% | 2.6% |

The secondary dust when reducing unwashed dust contained about 16% Cl, about 9% (Na+K), and about 55% Zn (about 68% ZnO), so was low in purity of Zn, but if adding refuse melting furnace fly ash to the electric furnace dust by a mass ratio of 10% and making the pH about 10 at the time of washing, the dust contained about 2.6% Cl, about 1.7% (Na+K), and about 69% Zn (about 86% ZnO), so was greatly improved in Zn purity.

INDUSTRIAL APPLICABILITY

According to the present invention, even if using a feed material containing large amounts of alkali metals and halogen elements in operating a rotary hearth type reduction furnace, it is possible to avoid the problem of deposition of dust at the exhaust gas treatment system and possible to economically reduce metal oxides to produce iron, nickel, and other metal materials.

In particular, the present invention is effective when the exhaust gas treatment system is provided with a waste heat boiler, heat exchanger, or other waste heat recovery system.

Further, by working the present invention, it is possible to raise the purity of the zinc or lead in the exhaust gas dust and possible to recover the dust as a good zinc and lead resource.

Further, according to the present invention, by washing the steelmaking waste adjusted in pH, there is the effect that it is possible to provide a method of treatment and system for treatment of steelmaking waste able to separately recover volatile harmful substances (potassium chloride, sodium chloride, etc.) and zinc oxide (ZnO) and further not requiring drying before charging the feed material into the moving hearth furnace and, on top of this, the purity of the zinc oxide able to be recovered is remarkably improved.

By using fly ash of a refuse melting furnace or incinerator furnace for the pH adjuster, it is possible to eliminate or reduce the amount of use of the expensive NaOH and other chemicals.

Further, since the basicity after washing (CaO/SiO$_2$) becomes 0.9 or more, if reducing the washed feed material by a moving hearth reduction furnace and recycling it as a resource of iron for an electric furnace etc., it is possible to reduce the amount of CaO used for adjusting the basicity.

The invention claimed is:

1. A method of reduction treatment of metal oxides, characterized by:
    using as a feed material a mixed powder of a powder containing both iron oxide and zinc oxide and/or lead oxide and containing alkali metals and halogen elements and a powder containing carbon, wherein an (alkali)/(zinc+lead) ratio is at least 0.1, where (alkali) is total moles of alkali salts and (zinc+lead) is total moles of zinc+lead,
    mixing said feed material with water sufficient to solubilize alkali salts to produce a slurry, wherein the pH of water forming said slurry is adjusted to within the range from 7 to 11.5 to reduce dissolution of zinc and/or lead compounds,
    then dehydrating said slurry, thereby providing a dehydrated material enriched in zinc and/or lead, wherein said dehydrated material is optionally shaped, and
    charging said dehydrated material directly into a rotary hearth type reduction furnace and reducing said dehydrated material in the rotary hearth type reduction furnace, said rotary hearth type reduction furnace provided with an exhaust gas treatment facility having at least one of a waste heat boiler and an air preheater.

2. A method of reduction treatment of metal oxides, characterized by using as a feed material a mixed powder of a powder containing both iron oxide and zinc oxide and/or lead oxide and containing alkali metals and halogen elements and a powder containing carbon, wherein an (alkali)/(zinc+lead) ratio is at least 0.1, where (alkali) is total moles of alkali salts and (zinc+lead) is total moles of zinc+lead,
    mixing said feed material with water sufficient to solubilize alkali salts to produce a slurry, wherein the pH of water forming said slurry is adjusted to within the range from 7 to 11.5 to reduce dissolution of zinc and/or lead compounds, then dehydrating said slurry, thereby providing a dehydrated material enriched in zinc and/or lead, wherein said dehydrated material is optionally shaped, mixing the dehydrated material with another feed material, and charging said mixture directly into a rotary hearth type reduction furnace and reducing said dehydrated material in the rotary hearth type reduction furnace, said rotary hearth type reduction furnace provided with an exhaust gas treatment facility having at least one of a waste heat boiler and an air preheater.

3. A method of reduction treatment of metal oxides as set forth in claim 1 or 2, characterized in that said powder contains a total of at least 0.1 mass % of alkali metals and halogen elements.

4. A method of reduction treatment of metal oxides as set forth in claim 1 or 2, characterized in that a mass ratio of powder and water in said slurry is at least 1:1.5 and a mass ratio of powder and water in said dehydrated material is not more than 1:0.4.

5. A method of reduction treatment of metal oxides as set forth in claim 1 or 2, characterized by heating and agitating the slurry at 80° C. or less in the production of said slurry.

6. A method of reduction treatment of metal oxides as set forth in claim 1 or 2, characterized by shaping said dehydrated material into moist shaped articles having a porosity of at least 35% and charging said shaped articles directly into a rotary hearth type reduction furnace for reduction without drying.

7. A method of reduction treatment of metal oxides as set forth in claim 6, characterized by making a mass ratio of powder and water in said dehydrated material 1:0.2 to 1:0.4 and shaping said dehydrated material into moist shaped articles having an average volume of not more than 10000 $mm^3$.

8. A method of reduction treatment of metal oxides as set forth in claim 7, characterized by making a molar ratio of oxygen and carbon contained in said shaped articles 1:0.6 to 1:1.5, charging said shaped articles directly into a rotary hearth type reduction furnace, and reducing them by leaving them for at least 8 minutes at the part of the furnace having a gas temperature or 1200° C. or more.

9. A method of reduction treatment of metal oxides as set forth in claim 1 or 2, characterized in that said powder is steelmaking waste.

10. A method of concentrating and recovering zinc and/or lead characterized by:

recovering dust in exhaust gas produced in the method of reduction treatment of metal oxides as set forth in any of claims 1 and 2 as a feed material for concentrating and recovering zinc and/or lead.

* * * * *

UNITED STATES PATENT AND TRADEMARK OFFICE
CERTIFICATE OF CORRECTION

PATENT NO. : 8,308,844 B2  Page 1 of 1
APPLICATION NO. : 12/930952
DATED : November 13, 2012
INVENTOR(S) : Hiroshi Ichikawa et al.

It is certified that error appears in the above-identified patent and that said Letters Patent is hereby corrected as shown below:

In the Specifications

Column 1, line 6-12, change

"This application is a continuation of U.S. Ser. No. 10/527,809, filed Nov. 9, 2005, now U.S. Pat. No. 7,879,132 B2, which is a national stage application of International Application No. PCT/JP03/11654, filed Sep. 11, 2003, which claims priority to Japanese Application Nos. 2002-268414, filed Sep. 13, 2002, and 2003-014268, filed Jan. 23, 2003, each of which is incorporated by reference in its entirety."

to

-- This application is a continuation of U.S. Ser. No. 10/527,809, filed Nov. 9, 2005, now U.S. Pat. No. 7,879,132 B2, which is a national stage application of International Application No. PCT/JP03/11654, filed Sep. 11, 2003, which claims priority to Japanese Application Nos. 2002-268414, filed Sep. 13, 2002, 2003-014268, filed Jan. 23, 2003, and 2003-107420, filed April 11, 2003, each of which is incorporated by reference in its entirety. --

Signed and Sealed this
Seventeenth Day of December, 2013

Margaret A. Focarino
*Commissioner for Patents of the United States Patent and Trademark Office*